US009309055B2

(12) United States Patent
Pedretti et al.

(10) Patent No.: US 9,309,055 B2
(45) Date of Patent: Apr. 12, 2016

(54) FEEDING UNIT AND METHOD FOR FEEDING SEALED PACKS OF POURABLE FOOD PRODUCTS

(75) Inventors: Richard Pedretti, Casinalbo di Formigine (IT); Paolo Fontanazzi, Modena (IT); Fabrizio Rimondi, Castel San Pietro Terme (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 5 days.

(21) Appl. No.: 14/127,506

(22) PCT Filed: Sep. 5, 2012

(86) PCT No.: PCT/EP2012/067245
§ 371 (c)(1),
(2), (4) Date: Jan. 22, 2014

(87) PCT Pub. No.: WO2013/064291
PCT Pub. Date: May 10, 2013

(65) Prior Publication Data
US 2014/0131173 A1 May 15, 2014

(30) Foreign Application Priority Data

Oct. 31, 2011 (EP) .................................... 11187354

(51) Int. Cl.
*B65G 15/00* (2006.01)
*B65G 19/02* (2006.01)
(Continued)

(52) U.S. Cl.
CPC ................ *B65G 19/02* (2013.01); *B65B 43/52* (2013.01); *B65B 61/28* (2013.01); *B65G 19/225* (2013.01); *B65G 19/245* (2013.01)

(58) Field of Classification Search
CPC ..... B65G 19/02; B65G 19/225; B65G 19/245
USPC .............................. 198/626.1, 734, 604, 605
See application file for complete search history.

(56) References Cited

U.S. PATENT DOCUMENTS 2,202,399 A * 5/1940 Riesen, Sr. .................... 198/629
3,220,537 A * 11/1965 Nixon ........................ 198/465.3
(Continued)

FOREIGN PATENT DOCUMENTS

CN 101397060 A 4/2009
CN 101652288 A 2/2010
(Continued)

OTHER PUBLICATIONS

International Search Report (PCT/ISA/210) mailed on Dec. 6, 2012, by the European Patent Office as the International Searching Authority for International Application No. PCT/EP2012/067245.
(Continued)

*Primary Examiner* — William R Harp
(74) *Attorney, Agent, or Firm* — Buchanan Ingersoll & Rooney PC

(57) ABSTRACT

There is described a feeding unit for feeding sealed packs of pourable food products to a folding unit configured to form folded packages from relative the packs; the feeding unit comprising a feeding conveyor adapted to receive packs at an inlet station of the feeding unit and to drive them to an outlet station of the feeding unit; the feeding conveyor comprising at least one push member movable cyclically and having a cooperating surface adapted to cooperate, in use, with a relative pack to push it towards the outlet station along a substantially rectilinear portion of an advancement path, wherein the cooperating surface has an involute-shaped profile. Furthermore, there is provided a corresponding method for feeding sealed packs of pourable food products to a folding unit.

14 Claims, 6 Drawing Sheets

(51) Int. Cl.
  *B65B 43/52* (2006.01)
  *B65B 61/28* (2006.01)
  *B65G 19/22* (2006.01)
  *B65G 19/24* (2006.01)

(56) References Cited

U.S. PATENT DOCUMENTS

| | | | | |
|---|---|---|---|---|
| 4,159,056 | A * | 6/1979 | Pirman et al. | 198/726 |
| 5,966,899 | A | 10/1999 | Fontanazzi | |
| 7,731,015 | B2 * | 6/2010 | Abe et al. | 198/620 |
| 8,061,507 | B2 * | 11/2011 | Menozzi et al. | 198/468.11 |
| 2014/0123595 | A1 * | 5/2014 | Pedretti et al. | 53/167 |
| 2014/0194267 | A1 * | 7/2014 | Pradelli | 493/243 |
| 2014/0196417 | A1 * | 7/2014 | Galata' | 53/551 |
| 2014/0223858 | A1 * | 8/2014 | Pedretti et al. | 53/203 |
| 2014/0228193 | A1 * | 8/2014 | Pradelli et al. | 493/180 |

FOREIGN PATENT DOCUMENTS

| | | |
|---|---|---|
| CN | 102145764 A | 8/2011 |
| EP | 0887261 A1 | 12/1998 |
| GB | 1016924 A | 1/1966 |

OTHER PUBLICATIONS

Office Action (Text of First Office Action) issued on Sep. 9, 2014, by the State Intellectual Property Office of People's Republic China in corresponding Chinese Patent Application No. 201280032837.3, and an English translation of the Office Action. (10 pages).
U.S. Appl. No. 14/127,505, filed Feb. 11, 2014, Pedretti et al.
U.S. Appl. No. 14/127,613, filed Jan. 24, 2014, Pedretti et al.
U.S. Appl. No. 14/127,586, filed Jan. 24, 2014, Galata.
U.S. Appl. No. 14/127,503, filed Feb. 11, 2014, Pradelli.
U.S. Appl. No. 14/127,520, filed Jan. 22, 2014, Pedretti et al.

* cited by examiner

FEEDING UNIT AND METHOD FOR FEEDING SEALED PACKS OF POURABLE FOOD PRODUCTS

TECHNICAL FIELD

The present invention relates to a feeding unit for feeding sealed packs of pourable food products to a folding unit configured to form folded packages from the pillow packs. Furthermore, the present invention relates to a corresponding method for feeding sealed packs of pourable food products to a folding unit.

BACKGROUND ART

Many liquid or pourable food products, such as fruit juice, UHT (ultra-high-temperature treated) milk, wine, tomato sauce, etc., are typically sold in packages made of sterilized packaging material.

A typical example is the parallelepiped-shaped package for liquid or pourable food products known as Tetra Brik Aseptic (registered trademark), which is formed by creasing and sealing laminated strip packaging material.

The packaging material has a multilayer structure comprising a base layer, e.g. of paper, covered on both sides with layers of heat-seal plastic material, e.g. polyethylene. In the case of aseptic packages for long-storage products, such as UHT milk, the packaging material may also comprise a layer of gas and light-barrier material, e.g. an aluminium foil, which is superimposed on a layer of heat-seal plastic material, and is in turn covered with another layer of heat-seal plastic material forming the inner face of the package ultimately contacting the food product.

Packages of this sort are normally produced on fully automated packaging machines, on which a continuous tube is formed from the web-fed packaging material. The web of packaging material is sterilized on the packaging machine, e.g. by applying a chemical sterilizing agent, such as a hydrogen peroxide solution, which, once sterilization is completed, is conveniently removed from the surfaces of the packaging material, e.g. evaporated by heating. The web thus sterilized is then maintained in a closed, sterile environment, and is folded and sealed longitudinally to form a tube, which is fed vertically with the food product.

In order to complete the forming operations, the tube is filled with the sterilized or sterile-processed food product, and is sealed and subsequently cut along equally spaced cross sections.

More precisely, the tube is sealed longitudinally and transversally to its own axis. From this sealing operation, pillow packs are obtained, which have a longitudinal seal and respective top and bottom transversal seals.

Alternatively, the packaging material may be cut into blanks, which are formed into packages on forming spindles, and the packages are then filled with the food product and sealed. One example of this type of package is the so-called "gable-top" package known by the trade name Tetra Rex (registered trademark).

Each pillow pack also comprises, for each top and bottom end portion, an elongated substantially rectangular fin projecting from respective sealing bands; and a pair of substantially triangular flaps projecting from opposite sides of relative end portion and defined by respective trapezoidal walls.

The end portions are pressed towards each other by the folding unit to form flat opposite end walls of the pack, while at the same time folding the flaps of the top portion onto respective lateral walls of the main portion and the flaps of the bottom portion onto the bottom sealing line.

Packaging machines of the above type are known, on which the pillow packs are turned into folded packages by automatic folding units.

Folding units are known, for example from EP-B-0887261 in the name of the same Applicant, which substantially comprise:

a chain conveyor for feeding packs continuously along a forming path from a supply station to an output station;

a number of folding devices arranged in fixed positions relative to the forming path and cooperating with packs to perform relative folding operations thereon;

a heating device acting on respective triangular flaps of each pack to be folded, to melt and seal them onto respective walls of the pack; and a pressing device cooperating with each pack to hold the triangular flaps in the respective folded positions as these portions cool.

The step of transferring and feeding pillow packs to the inlet station of the folding unit is critical for proper operation of the folding unit.

In practice, pillow packs are typically formed and sealed with their longitudinal axis arranged vertically. Subsequently, the newly formed pillow packs are let slide along a curved-profile chute so as to be brought from the vertical position to the horizontal position, in which they are received by a feeding conveyor, arranged immediately downstream of the chute and which drives the pillow packs to the inlet station of the folding unit.

A need is felt in the industry for a feeding unit which is capable of ensuring very smooth motion conditions for the pillow packs being fed to the receiving station of a folding unit. In particular, it is highly desirable that a unit for feeding pillow packs to a folding unit subject the pillow packs to dynamic conditions as consistently homogeneous and smooth as possible, while ensuring that the very transfer of the pillow packs from the conveyor to the receiving station may always be properly timed. At the same time, it is always preferable that pillow packs be subjected to as few yanks and stresses as possible, as they advance towards the folding unit.

DISCLOSURE OF INVENTION

It is therefore an object of the present invention to provide a feeding unit for feeding sealed packs of pourable food products to a folding unit and designed to meet the need identified above in a straightforward and inexpensive manner.

BRIEF DESCRIPTION OF THE DRAWINGS

A preferred, non-limiting embodiment of the present invention will be described by way of example with reference to the accompanying drawings, in which.

BEST MODE FOR CARRYING OUT THE INVENTION

Figure 1:
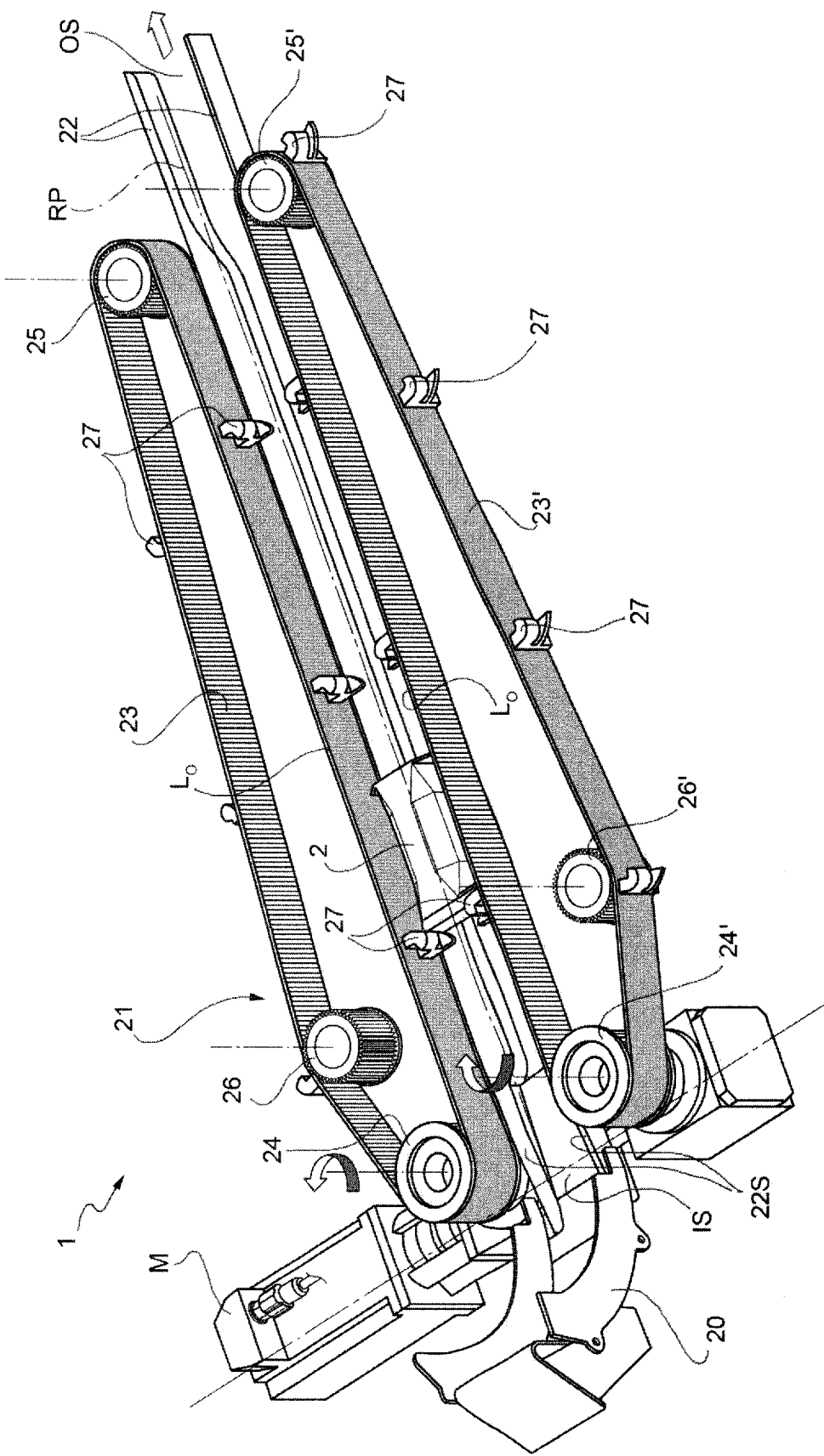
FIG. 1 is a perspective view of a feeding unit for pourable food product packaging machines, in accordance with the present invention.

Number 1 in FIG. 1 indicates as a whole a feeding unit for a packaging machine for continuously producing sealed, substantially prismatic-shaped packages of a pourable food product, such as pasteurized or UHT milk, fruit juice, wine, etc., from a known tube, not shown, of packaging material.

The packaging machine substantially comprises:
feeding unit 1 according to the invention, as shall be described in greater detail in the following; and
a folding unit.

The tube is formed in known manner upstream from unit 1 by longitudinally folding and sealing a known web (not shown) of heat-seal sheet material, which comprises a layer of paper material covered on both sides with layers of heat-seal plastic material, e.g. polyethylene. In the case of an aseptic package for long-storage products, such as UHT milk, the packaging material comprises a layer of oxygen-barrier material, e.g. aluminium foil, which is superimposed on one or more layers of heat-seal plastic material eventually forming the inner face of the package contacting the food product.

The tube of packaging material is then filled with the food product for packaging, and is sealed and cut along equally spaced cross sections to form a number of pillow packs 2 (FIG. 2), which are then transferred to feeding unit 1.

For the sake of convenience, reference shall be made in the following to a specific pack geometry, which will be described in detail. However, it shall be apparent that this is intended merely as an example and that the feeding unit 1 of the invention may be conveniently used with packs of different geometries, provided that they can lie in a substantially horizontal position and that the feeding unit 1 may cooperate with a wall of the pack transversal to a horizontal plane in which the pack is advanced.

Figure 2:
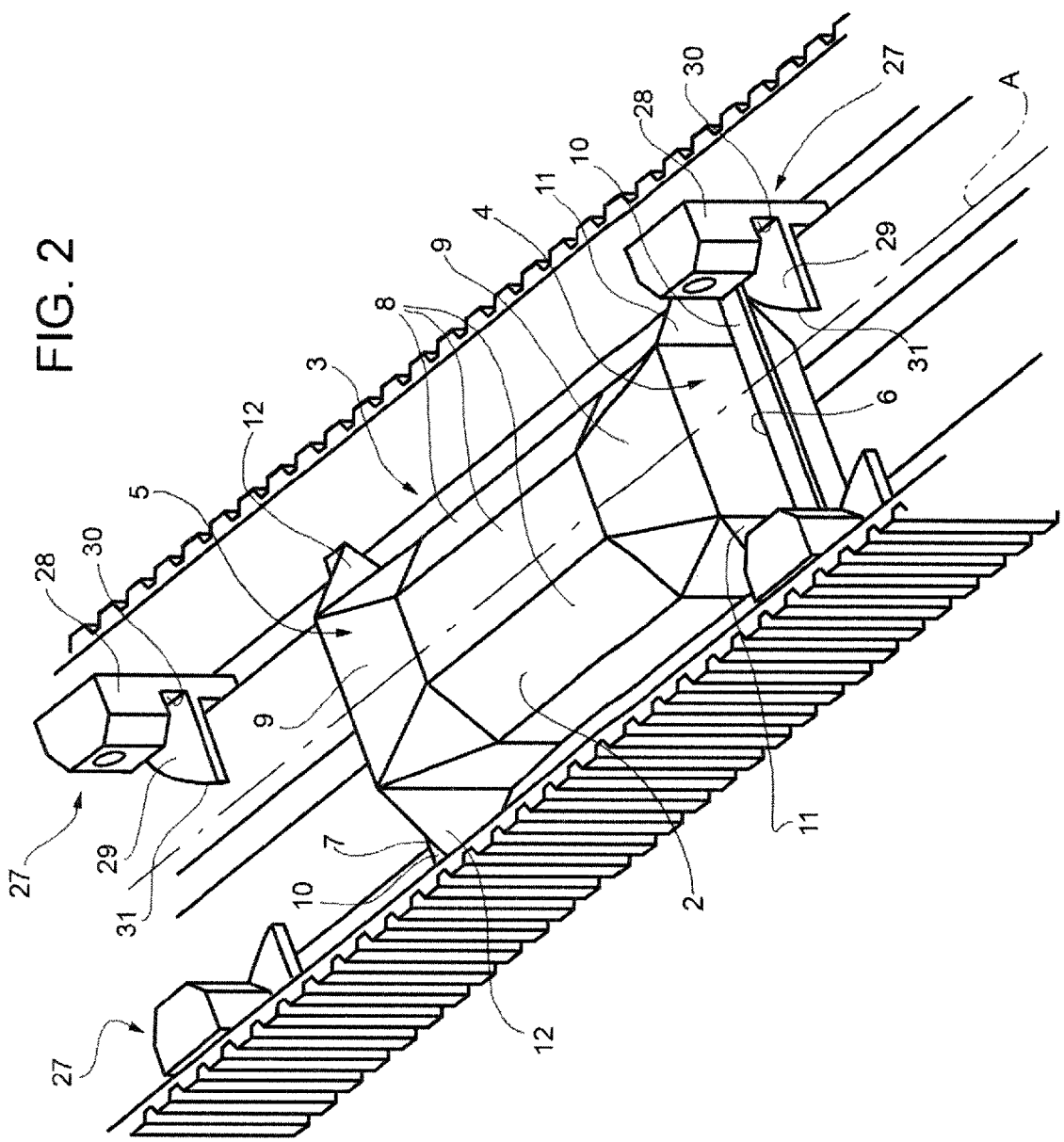
FIG. 2 is an enlarged perspective view of the feeding unit of FIG. 1 cooperating with a pillow pack.

With reference to FIG. 2, each pillow pack 2 has an axis A, and comprises a substantially prismatic-shaped main portion 3 defined by a plurality, eight in the embodiment shown, of walls 8; and opposite, respectively top and bottom, end portions 4, 5 tapering from portion 3 to respective sealing bands 6, 7, crosswise to axis A, of pillow pack 2.

Each end portion 4, 5 is defined at least partly by two walls 9 substantially in the form of an isosceles trapezium, sloping slightly towards each other with respect to a plane perpendicular to axis A, and having minor edges defined by end edges of respective walls 8 of portion 3, and major edges joined to each other by the respective sealing band 6, 7.

For each portion 4, 5, each pack 2 has an elongated, substantially rectangular fin 10 projecting from the respective sealing band 6, 7; and two substantially triangular flaps 11, 12 projecting laterally from opposite sides of portion 3 and defined by end portions of relative walls 9.

To form a package, the folding unit presses portions 4, 5 of pillow pack 2 towards each other, whereas respective fins 10 are folded onto portions 4, 5; folds and seals flaps 11 of portion 4 onto relative walls 8; and folds and seals flaps 12 of flattened portion 5.

A detailed description of the folding unit may be found in European application "Folding unit and method for pourable food product packaging machines", filed by the Applicant concurrently with the present invention.

Feeding unit 1 (see FIG. 1) comprises a curved-profile chute 20 for receiving, from a relative formation and filling unit (not shown), newly formed pillow packs 2 with their respective longitudinal axes arranged vertically, whereby the pillow packs 2 are slideably brought to lie in a substantially horizontal plane.

Furthermore, feeding unit 1 comprises a feeding conveyor 21, arranged immediately downstream of chute 20 and adapted to receive the pillow packs 2 at a relative inlet station IS and to drive them to a relative outlet station OS—which shall substantially correspond to a respective receiving station of the folding unit.

Feeding conveyor 21 comprises a pair of stationary rails 22 extending from chute 20 to the outlet station OS of the feeding unit, and defining a substantially rectilinear portion RP of an advancement path of pillow packs 2. In particular, the rectilinear portion RP extends from the inlet station IS, at which pillow packs are picked from feeding conveyor 21, to the outlet station OS.

More particularly, stationary rails 22 have (see e.g. FIG. 3) respective portions 22S which are sloped relative to the vertical axis, their height increasing along the rectilinear portion RP in the direction from chute 20 towards the folding unit, so as to smoothly receive the incoming pillow packs 2. Curved-profile chute 20 comprises (FIG. 3) a bottom portion 20B gently sloping towards stationary rails 22 and extending at least partly between the relative sloped portions 22S, thereby defining the inlet station IS at which pillow packs 2 are to be picked from feeding conveyor 21.

To this purpose, feeding conveyor 21 comprises a pair of endless belts 23, 23' arranged at and extending along opposite lateral sides of stationary rails 22 (FIG. 1).

More particularly, each endless belt 23, 23' is closed in a loop about a drive pulley 24, 24', a return pulley 25, 25', and preferably at least one tightener 26, 26' and is adapted to interact with pillow packs 2 to move the packs along path portion RP from chute 20 to the inlet station of the folding unit.

Figure 3:
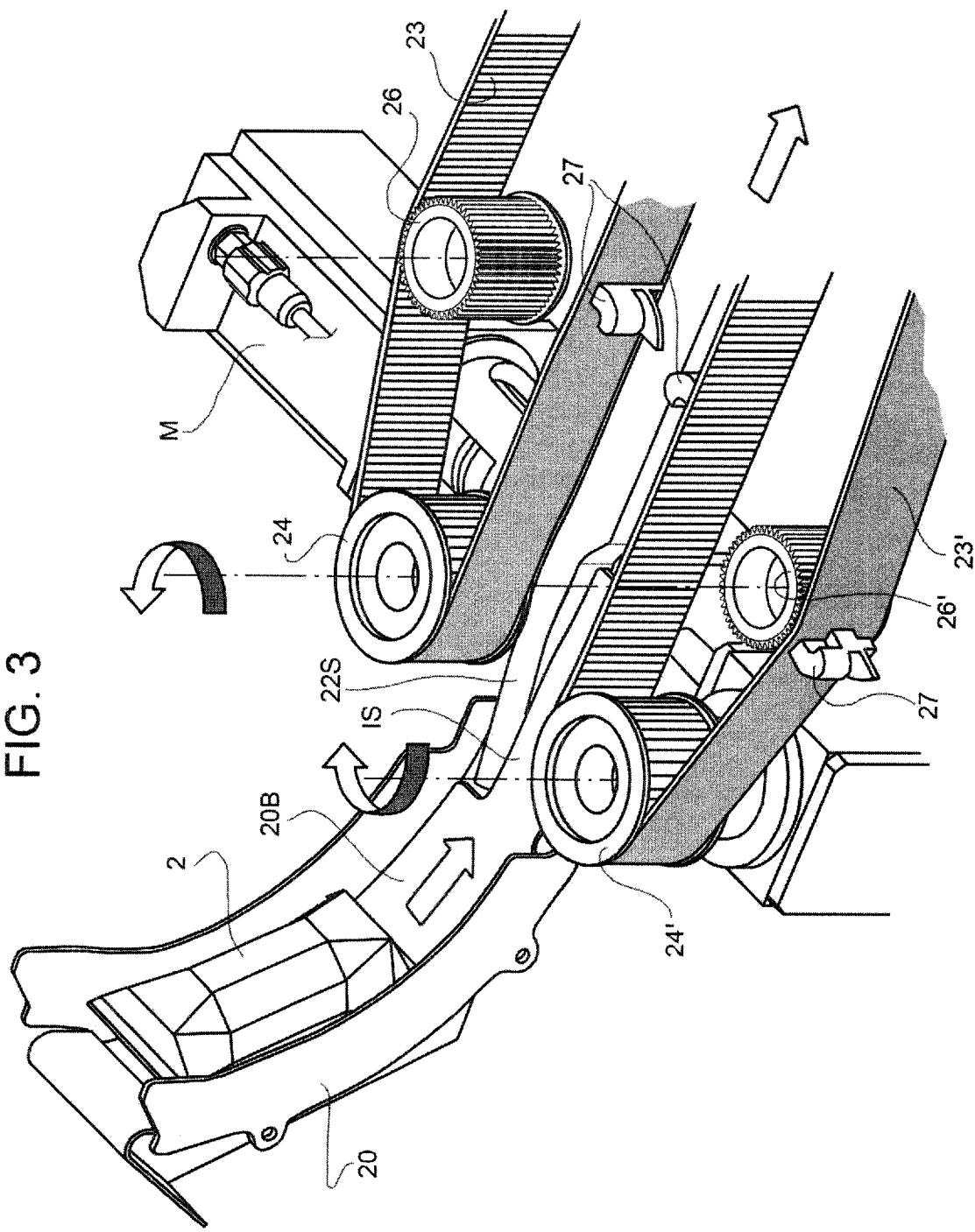
FIG. 3 is an enlarged detailed perspective view of the feeding unit of FIG. 1 shown as a pillow pack slides along the chute.

Feeding unit 1 further comprises driving means M for driving drive pulleys 24, 24'. By way of example, as illustrated in FIGS. 1 and 3, driving means M may comprise a single motor driving, through suitable kinematic coupling means, both drive pulleys 24, 24'. As shall be apparent, for the pillow packs 2 to advance along path portion RP towards the folding unit, drive pulley 24 shall be driven to rotate in an anti-clockwise direction, whereas drive pulley 24' shall be driven to rotate in a clockwise direction.

Feeding unit 1 may, accordingly, comprise a control unit (not shown) for managing operation of driving means M.

As illustrated in FIG. 1, each loop of a respective endless belt 23, 23' comprises an operating branch $L_0$ running substantially parallel to a relative rail 22. In particular, operating branches $L_0$ of both endless belts are substantially parallel to one another.

Preferably, the loops of the pair of endless belts 23, 23' are substantially symmetrical with respect to a longitudinal and symmetry axis of the pair of rails 22.

In the embodiment shown, push members 27 are equally spaced along each endless belt 23, 23' and travel, in use, along an endless path having the same shape as the relative loop. On both endless belts 23, 23', push members 27 have the same pitch.

Furthermore, push members 27 are adapted to cooperate, in use, with pillow packs 2 to push them towards the folding unit. Preferably, push members 27 are adapted to cooperate with each pillow pack 2 at the respective top end portion 4 (FIG. 2).

On feeding conveyor 21, each pack 2 is positioned (see FIG. 2) with two opposite walls 8 facing respective endless belts 23, 23' and with portion 4 resting against a relative push member 27.

More particularly, each push member 27 comprises (see FIG. 2) a fixing portion 28 fastened at the respective endless belt 23, 23' and an operating portion which extends from fixing portion 28 towards the opposite endless belt 23', 23 and is adapted to cooperate, in use, with pillow packs 2 at the top end portion 4 thereof to push them towards the folding unit.

Preferably, operating portion 29 is arranged at a height, with respect to the width of the respective endless belt 23, 23', such as to cooperate with a bottom section of top end portion 4 of pillow packs 2, i.e. below fin 10.

More preferably, each push member 27 comprises a slit 30 adapted to freely receive fin 10 as the pillow pack 2 is pushed towards the folding unit. In other words, push members 27 are designed to accommodate fin 10 substantially without ever contacting it.

Slit 30 of each push member 27 is interposed between relative operating portion 29 and fixing portion 28 along a direction orthogonal to axis A.

In this way, operating portion 29 and fixing portion 28 of each push member 27 are arranged on opposite side of fin 10 received by slit 30.

The operating portion 29 of each push member 27 has a cooperating surface 31 adapted to cooperate, in use, with the packs.

Advantageously, operating surface 31 has an involute-shaped profile.

In particular, the cooperating surface 31 has a circle-involute-shaped profile.

Push members 27 attached at opposite endless belts 23 and 23' are symmetrical to one another, i.e. their respective operating portions 29 extend towards one another, their involute-shape profile originating from the respecting fixing portion 28 (FIG. 1).

Operation of feeding unit 1 will now be described with reference to one pack 2, and as of the instant in which said pack 2 is received at curved profile chute 20 (see FIG. 3).

Figure 4:
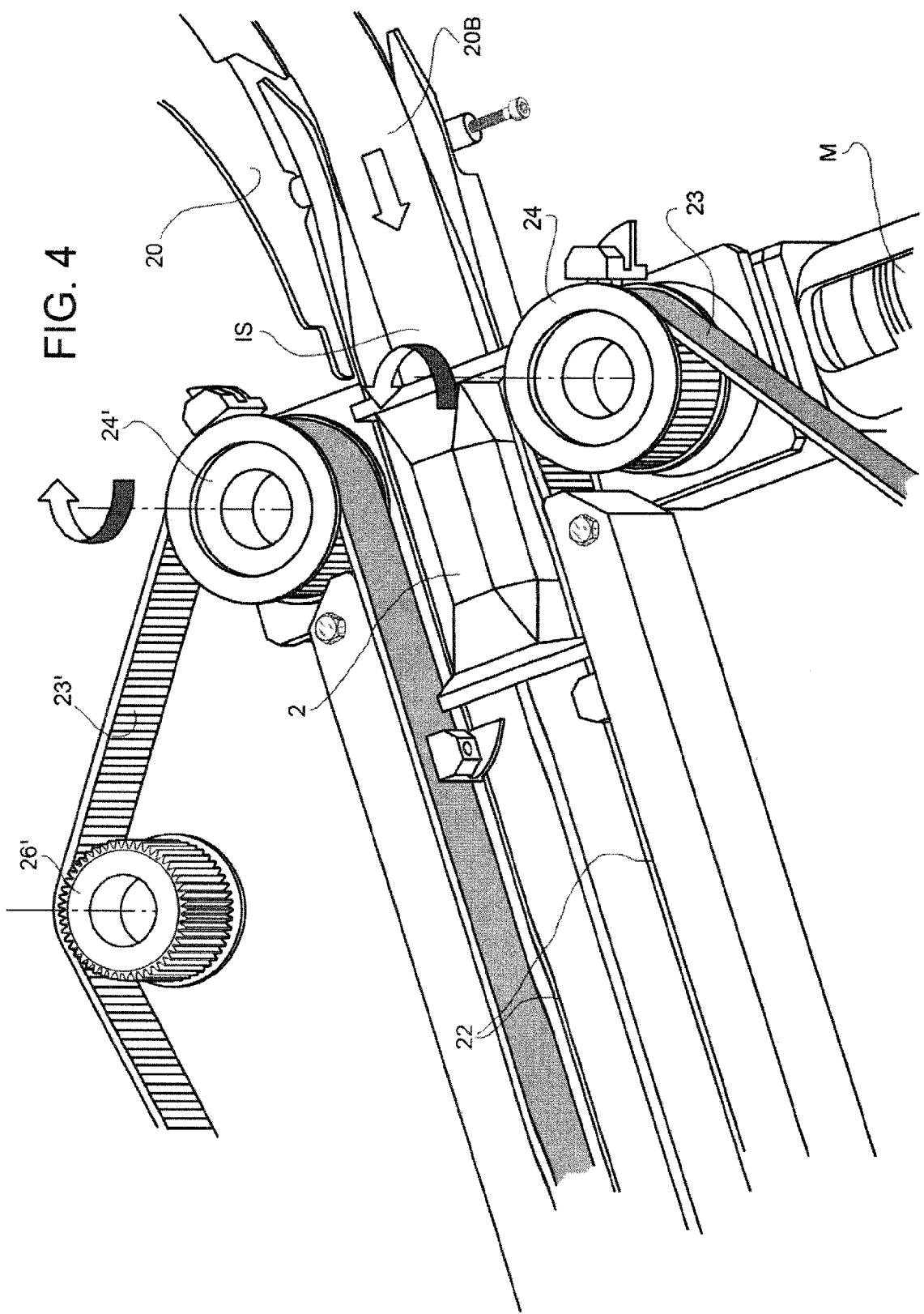
FIG. 4 is a further enlarged perspective view, taken under a different visual angle, of the feeding unit of FIG. 1, shown as a pillow pack is advanced towards the folding unit.

As the pillow pack 2 slides along curved profile chute 20, its orientation in space is changed from vertical to horizontal, the pack 2 ultimately lying in a horizontal plane at the inlet station IS (FIG. 4).

Driving means M are continuously actuated to drive feeding conveyor 21 to pick the pillow pack 2 at the inlet station IS and to advance it to the outlet station OS of the feeding unit (FIG. 1).

Figure 5:
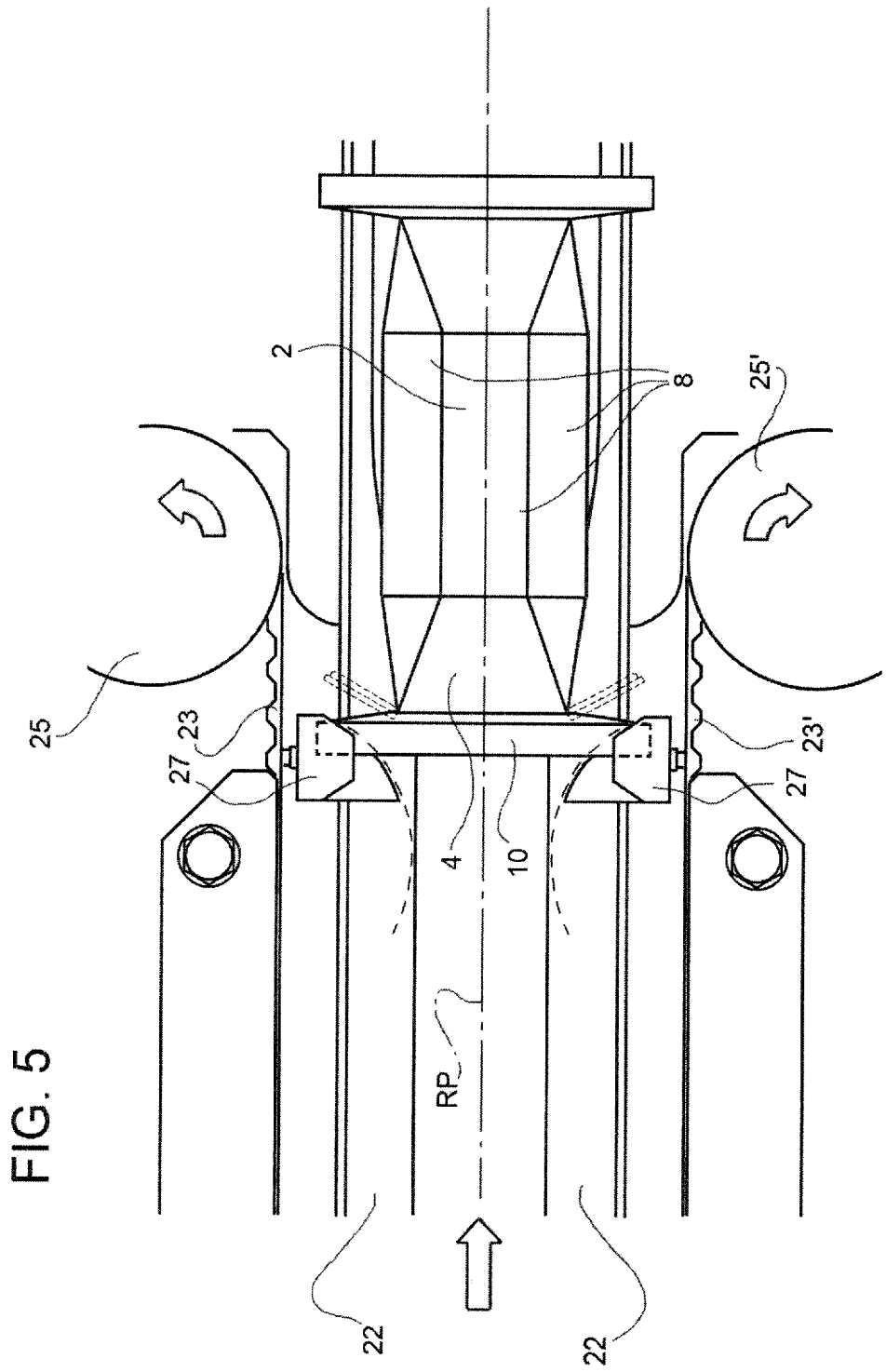
FIG. 5 is an enlarged top view of the feeding unit of FIG. 1 as a pillow pack is about to be released from the conveyor at the inlet station of the folding unit.

Accordingly, a pair of push members 27 borne by respective endless belts 23, 23' reach inlet station IS in timely fashion to start to cooperate with the pillow pack 2 newly delivered thereat. Synchronisation of the endless belts 23, 23' is preferably controlled with a view to starting cooperation with a pillow pack 2 as soon as it reaches the horizontal position. In particular, the pair of push members 27 applies a respective pushing force on the top end portion 4 of pillow pack 2 (see FIG. 5). Preferably, push members 27 cooperate with a bottom section of top end portion 4, i.e. below fin 10.

Upon actuation of driving means M, couple of push members 27 borne by endless belts 23, 23' advances the pillow pack 2 along the rectilinear path RP towards the folding unit.

As pillow pack 2 reaches the end of stationary rails 22 opposite chute 20 (FIG. 1), push members 27 correspondingly reach the end of rectilinear path RP and, more particularly, return pulleys 25, 25' (which are idle pulleys), where they are to turn around and ultimately lose contact with the pillow pack 2 at the outlet station OS.

Advantageously, pillow packs 2 are released from conveyor 21 at a constant linear speed along the rectilinear path RP at the outlet station IS.

Figure 6:
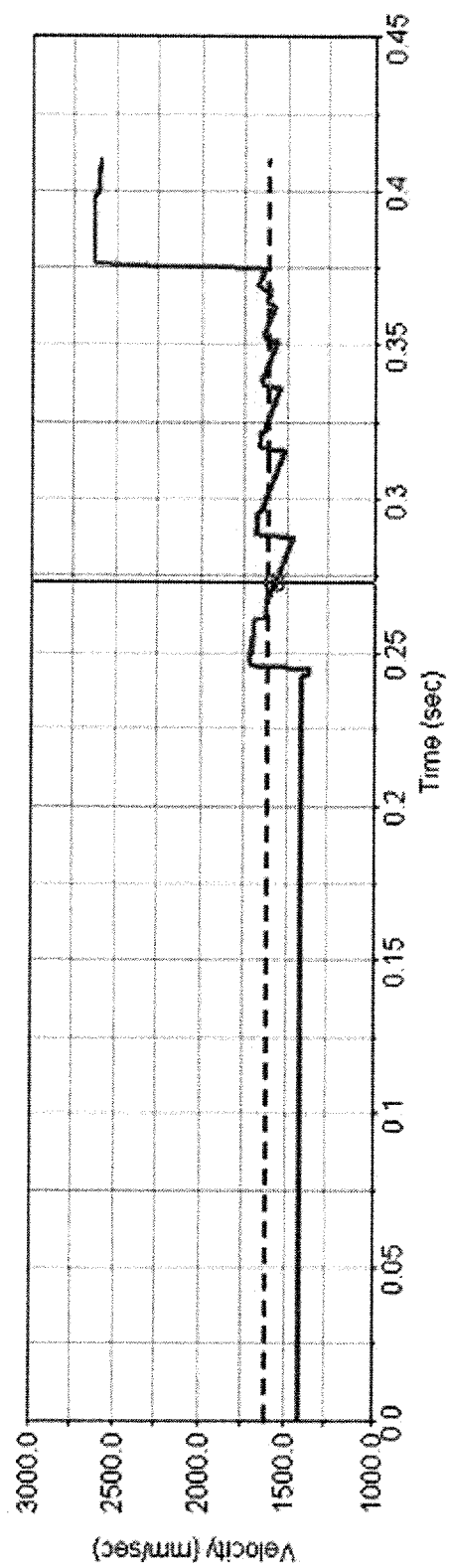
FIG. 6 is a speed-vs.-time plot comparing the behavior of the feeding unit of the invention with the behavior of a feeding unit according to the prior art.

FIG. 6 shows a speed-vs.-time plot wherein the behavior of the feeding unit 1 of the invention is compared with the behavior of a conventional feeding unit.

In particular, the dashed line refers to the feeding unit of the invention, whereas the continuous line is relative to a conventional feeding unit. As shown evidently by the plots of FIG. 6, the linear speed at which packs are released along the rectilinear path RP as they approach the folding unit remains constant with the feeding unit of the invention, whereas, with a conventional feeding unit, the speed of the pack undergoes a significant number of dynamic oscillations as the pack approaches the receiving station of the folding unit, at which it is brusquely accelerated.

Because they cooperate with pack 2 with the involute-profile operating portion 29, push members 27 keep applying on the pack 2 always the same thrust without imparting the pack 2 any acceleration.

As push member 27 turns about the respective idle return pulley 25, 25', the point of contact of the push member 27 with the pack 2 changes instant by instant, progressively moving along the involute profile of operating portion 29 towards the projecting tip thereof, at which position the pillow pack 2 is ultimately released from feeding conveyor 21 at the outlet station OS. However, while moving along the involute profile of operating portion 29, the point of push member-pillow pack contact remains at a constant distance from the centre of the respective idle return pulley 25, 25'.

The advantages of feeding unit 1 and of the method according to the present invention will be clear from the foregoing description.

In particular, the involute-shaped profile of operating portion 29 of push members 27 cooperating with the pillow packs 2 to advance them towards the folding unit advantageously results in the packs 2 being subjected to a substantially constant and homogeneous thrust all along their path and, in particular, at the outlet station OS where they are released from feeding conveyor 21 and are to be picked by the folding unit.

Thus, the feeding unit 1 of the invention provides relatively smooth motion conditions for the pillow packs being fed to the receiving station of a folding unit, in that they are subjected to dynamic conditions as consistently homogeneous as possible, in particular at the critical stage where they are released from the conveyor, as shown clearly by the plots of FIG. 6.

Clearly, changes may be made to feeding unit 1 and to the method as described and illustrated herein without, however, departing from the scope defined in the accompanying Claims.

In particular, push members 27 may be adapted for cooperation with packs 2 having a different geometry, hence the position of the operating portion 29 relative to the fixing portion 28 may vary accordingly.

Furthermore, feeding unit 1 could comprise a single push member 27 to cooperate with a respective pillow pack 2.

The invention claimed is:

1. A feeding unit for feeding sealed packs of pourable food products to a folding unit configured to form folded packages from said packs; said feeding unit comprising a feeding conveyor adapted to receive packs at an inlet station of the feeding unit and to drive them to an outlet station of the feeding unit; said feeding conveyor comprising at least one push member movable cyclically between said inlet and outlet stations and having a cooperating surface adapted to cooperate, in use, with a relative said pack to push it towards said outlet station along a substantially rectilinear portion of a substantially horizontal advancement path, wherein said cooperating surface has an involute-shaped profile that discharges the relative said pack at a constant linear speed along the substantially horizontal advancement path.

2. The feeding unit according to claim 1, comprising:
   a pair of stationary rails extending from said inlet station to said outlet station and defining said substantially rectilinear portion of said substantially horizontal advancement path;
   a plurality of said push members; and
   a pair of endless belts arranged at and extending along opposite lateral sides of said stationary rails; said push members being arranged with the same pitch along each endless belt and travelling, in use, along an endless path having the same shape as the loop of the belt.

3. The feeding unit according to claim 2, wherein each push member comprises a fixing portion fastened at the respective endless belt and an operating portion extending from the fixing portion towards the opposite endless belt and adapted to cooperate, in use, with the packs at an end portion thereof, said operating portion defining said cooperating surface.

4. The feeding unit according to claim 3, wherein each push member comprises a slit adapted to freely receive a fin of said pack.

5. The folding unit of according to claim 4, wherein each slit is defined between said operative operating and fixing portions of relative push member.

6. The feeding unit according to claim 2, wherein said respective operating portions of push members attached at opposite endless belts extend towards one another, their involute-shape profile originating from the respective fixing portion.

7. The feeding unit according to claim 2, wherein each endless belt is closed in a loop about at least a drive pulley and a return pulley, the feeding unit comprising means for driving said belts.

8. The feeding unit according to claim 1, comprising a curved-profile chute for receiving said packs with their respective longitudinal axes arranged vertically, whereby packs are slideably brought to lie horizontally at said inlet station.

9. The feeding unit according to claim 1, wherein each push member comprises a slit adapted to freely receive a fin of said pack.

10. A packaging machine comprising:
    a feeding unit for feeding sealed packs of pourable food products to a folding unit configured to form folded packages from said packs, said feeding unit comprising a feeding conveyor adapted to receive packs at an inlet station of the feeding unit and to drive them to an outlet station of the feeding unit; said feeding conveyor comprising at least one push member movable cyclically between said inlet and outlet stations and possessing a cooperating surface adapted to cooperate, in use, with a relative said pack to push it towards said outlet station along a substantially rectilinear portion of a substantially horizontal advancement path, said cooperating surface possessing an involute-shaped profile that discharges the relative said pack at a constant linear speed along the substantially horizontal advancement path; and
    a folding unit adapted to receive packs at said outlet station of said feeding unit and configured to form folded packages from said packs.

11. A method for feeding sealed packs of pourable food products to a receiving station of a folding unit configured to form folded packages from said packs, comprising the steps of:
    a) pushing said packs along an advancement path comprising a substantially rectilinear portion; and
    b) releasing said packs at said receiving station;
    wherein said step b) of releasing said packs comprises the step of:
    c) discharging said packs at a constant linear speed along said advancement path portion at said receiving station.

12. The method according to claim 11, wherein the advancement path is substantially horizontal.

13. The method according to claim 11, wherein each pack is pushed along the advancement path by first and second feeding conveyors disposed on opposite sides of the advancement path.

14. The method according to claim 13, wherein each feeding conveyor comprises a push member movable cyclically around each feeding conveyor and possessing a cooperating surface configured to cooperate at a contact point with each pack,
    wherein a distance between the contact point of the push member of the first conveyor and the contact point of the push member of the second conveyor is constant as the pack is discharged at the constant linear speed along the advancement path portion at the receiving station.

\* \* \* \* \*